United States Patent [19]

Broquet

[11] 4,294,420
[45] Oct. 13, 1981

[54] ATTITUDE CONTROL SYSTEMS FOR SPACE VEHICLES

[75] Inventor: Jean B. Broquet, Saint Cyr l'Ecole, France

[73] Assignee: Matra, Paris, France

[21] Appl. No.: 873,684

[22] Filed: Jan. 30, 1978

[51] Int. Cl.³ .............................................. B64G 1/20
[52] U.S. Cl. .................................. 244/165; 244/171; 244/3.2; 244/3.22
[58] Field of Search ............... 244/165, 164, 171, 176, 244/177, 189, 190, 79, 3.19, 3.2, 3.21, 3.22; 73/178 R; 364/434

[56] References Cited

U.S. PATENT DOCUMENTS

| | | | |
|---|---|---|---|
| 3,116,035 | 12/1963 | Cutler | 244/176 |
| 3,350,033 | 10/1967 | Goldberg | 244/165 |
| 3,999,729 | 12/1976 | Muhlfelder | 244/165 |
| 4,012,018 | 3/1977 | Lorell | 244/165 |
| 4,038,527 | 7/1977 | Brodie et al. | 244/165 X |
| 4,071,211 | 1/1978 | Muhlfelder | 244/171 |
| 4,084,772 | 4/1978 | Muhlfelder | 244/169 |

OTHER PUBLICATIONS

"Control Engineering", vol. 10, No. 12, Dec. 19, 1963, N. Y., Paper by D. Otten, Attitude Control for an Orbiting Obs.:060.

*Primary Examiner*—J. D. Miller
*Assistant Examiner*—Reinhard J. Eisenzopf
*Attorney, Agent, or Firm*—Lane, Aitken, Kice & Kananen

[57] ABSTRACT

An attitude control system is provided for a body-stabilized orbiting space vehicle having roll, pitch and yaw axes. Sensors carried by the vehicle provide signals representative of angular deviations about at least two of said orthogonal axes. An actuator for the system comprises two wheels rotatable about respective non-aligned spin axes fixed with respect to the vehicle. An electronic control circuit receives signals from the sensors and controls the rotation speeds of the wheels for attitude correction about two of said orthogonal axes. Short term stabilization about the third of the orthogonal axes is provided by the gyroscopic stiffness of the actuator.

14 Claims, 7 Drawing Figures

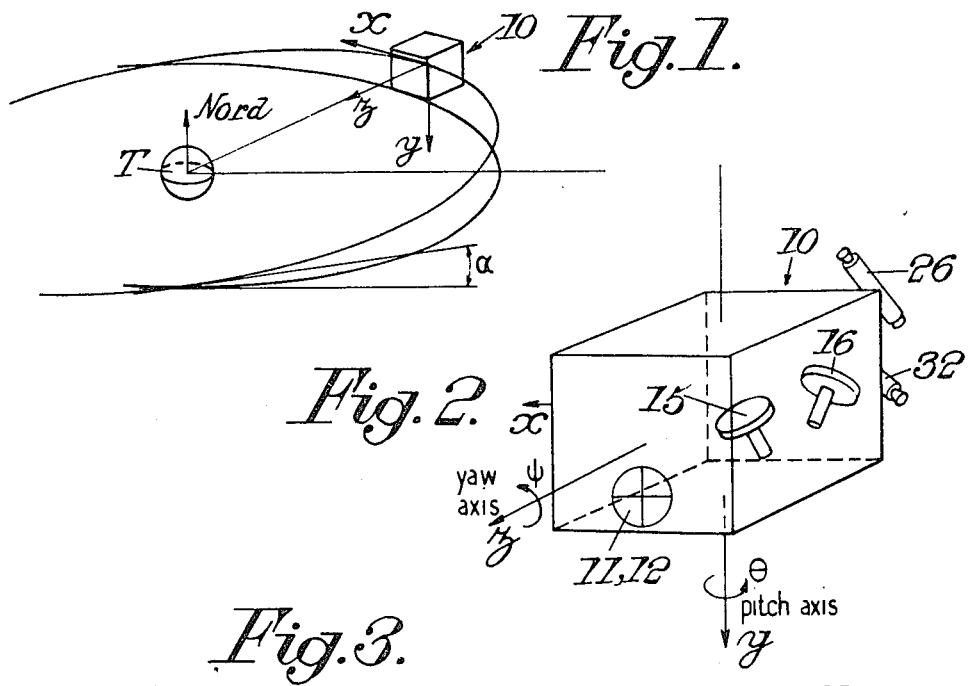
Fig. 1.
Fig. 2.
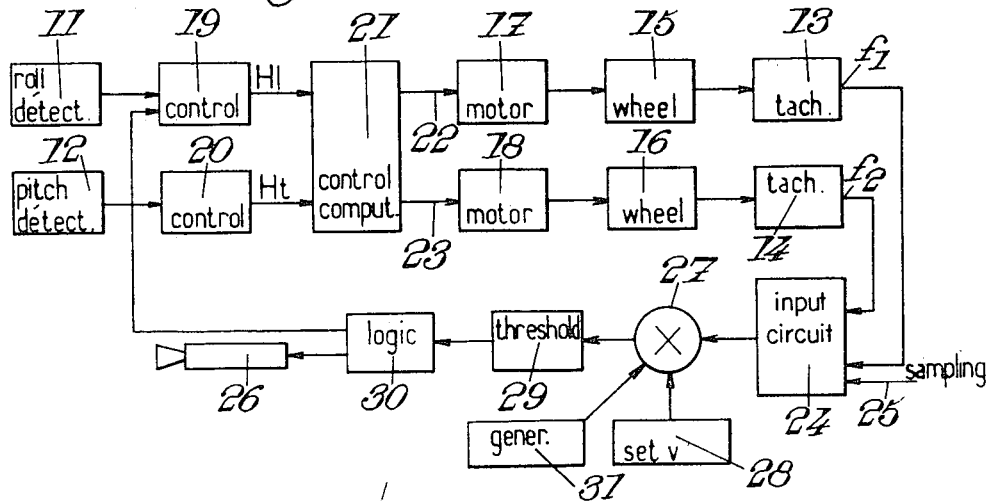
Fig. 3.
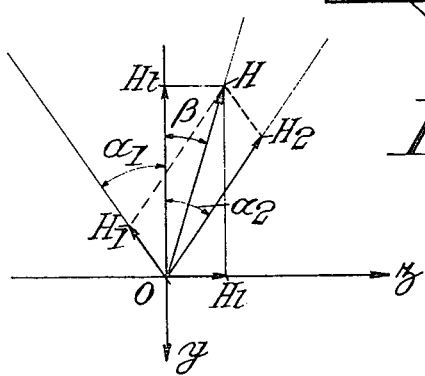
Fig. 4.

ATTITUDE CONTROL SYSTEMS FOR SPACE VEHICLES

The invention relates to an attitude control system for a body-stabilized (also called 3-axis stabilized or fully stabilized) space vehicle designed for travelling in an orbit, typically about earth. An important but non-exclusive use of the invention is for controlling the attitude of a geostationary satellite vehicle, e.g. a telecommunications satellite, orbiting around the earth in a high altitude orbit whose inclination $\alpha$ to the earth's equator has at most a value of a few degrees. The attitude of such a satellite has to be so maintained that elements carried by the satellite, such as antennas, are always oriented toward a particular region of the earth.

A number of such attitude control systems for body-stabilized satellites are known. Reference may be made in this respect to "Proceedings of the IEEE", March 1977, pages 348-349, as well as to U.S. Pat. No. 3,937,423 (Johansen). Typically such a system includes one large momentum wheel whose speed is controlled by a correcting network to correct pitch drifting due to external disturbances. However, the wheel, if rotating about a fixed axis, also affects the roll and yaw attitude, and if the angle of orientation of the satellite around its roll axis is maintained correctly, the angle of its orientation around its yaw axis is bound to vary cyclically by an amount approximately equal to the inclination $\alpha$ of the orbit to the earth equator. If the wheel is gimballed, control of the orientation of the spinning axis involves complex electronics. Another prior art attitude control system includes three reaction wheels respectively associated with the pitch, roll and yaw axes and associated sensors. The system is unduly heavy.

It is an object of the invention to provide a system which is relatively simple and lightweight and provides satisfactory attitude control about all axes.

According to the invention, there is provided an attitude control system for a body-stabilized space vehicle designed for travelling in an orbit and having roll, pitch and yaw orthogonal axes, comprising sensors carried by the vehicle for sensing angular deviations about at least two of said orthogonal axes, characterized in that said system has an actuator comprising at least two wheels rotatable about respective non-aligned spin axes fixed with respect to said vehicle and electronic control means connected to receive input signals from the sensors and to control the rotation speeds of the wheels for attitude correction about two of said orthogonal axes, said actuator permanently having, in operation, a momentum providing a gyroscopic stiffness providing short term stabilization about the third of said orthogonal axes.

The term "wheel" is to be construed as designating
either a reaction wheel used for attitude control by momentum exchange with the satellite body, having a speed variable within a broad range, typically adapted to be alternately rotated in either direction,
or a momentum wheel which is permanently rotating in operation at a speed sufficient to have a gyroscopic stiffness opposing change of orientation of the plane of rotation; as a rule, a momentum of at least 25 Nms will be required for a momentum wheel and such a wheel will have an available speed range which will be quite restricted typically ±10% about a nominal speed.

Since the actuator should have a gyroscopic stiffness, at least one of the wheels should be a momentum wheel.

In a first embodiment of the invention, which is particularly adapted for use in geostationary satellites, the two wheels are momentum wheels which have inertia of the same order of magnitude. Then the axes of the wheels typically make an angle of from 10° to 80°.

In another embodiment, the two wheels have momenta of different orders of magnitude and their axes make an angle of from 90° to 130°.

In all cases, the two wheels are so located that the actuator momentum has a component directed opposite to the positive direction of the pitch axis. Another condition to be fulfilled—if the vehicle is a geostationary satellite—is that the angle between the two wheels is higher than twice the maximum angle $\alpha$ between the orbit plane and the equator plane (about 8°). If two identical wheels are used, the angle between the wheel axes may be of from 10° to 40°.

For increased reliability, the system may be redundant. Redundancy may be achieved with two separate actuators and associated circuitry, one of which is operated in case of failure of the other. However, it will frequently be sufficient to achieve redundancy of the circuitry if the wheels have magnetic bearings.

The wheel axes may be in the same plane parallel to either the pitch-yaw plane or the pitch-roll plane, or in another plane containing the pitch axis and orthogonal to the roll-yaw plane.

Sensors may be located for sensing angular deviations about the roll and pitch axes and the axes of the wheels are each disposed in a plane parallel to the pitch and yaw axes.

Each wheel of the actuator may drive a tachometer generator associated with electronic means for computing the speed of the wheel in a large pass band; electronic closed loop circuits connected to receive signals from the tachometer generators may be provided to adjust the speeds of the wheels at set values provided by electronic circuits receiving input signals from the sensors.

The electronic means may include a sine wave signal generator at orbital frequency to define a set value of the momentum vector with respect to the orthogonal axes: the output of the sine wave signal generator is compared with the measured angular position of the momentum vector with respect to the orthogonal axes by the electronic means controlling the external torques and the difference is maintained close to zero or to a substantially constant set value.

The invention will be better understood from the following description of a particular embodiment and of modifications thereof, reference being made to the accompanying drawings, wherein:

FIG. 1 is a schematic diagram showing a space vehicle, in the form of a satellite, travelling on an earth orbit at a slight inclination to the earth's equator;

FIG. 2 is a diagram showing the arrangement of the inertia wheels constituting the actuator of the vehicle relatively to roll, pitch and yaw axes of the vehicle, according to a first embodiment of the invention:

FIG. 3 is a diagram showing the control electronics;

FIG. 4 is an explanatory graph illustrating the components of the momentum of the actuator of FIG. 2;

Figure 3A:
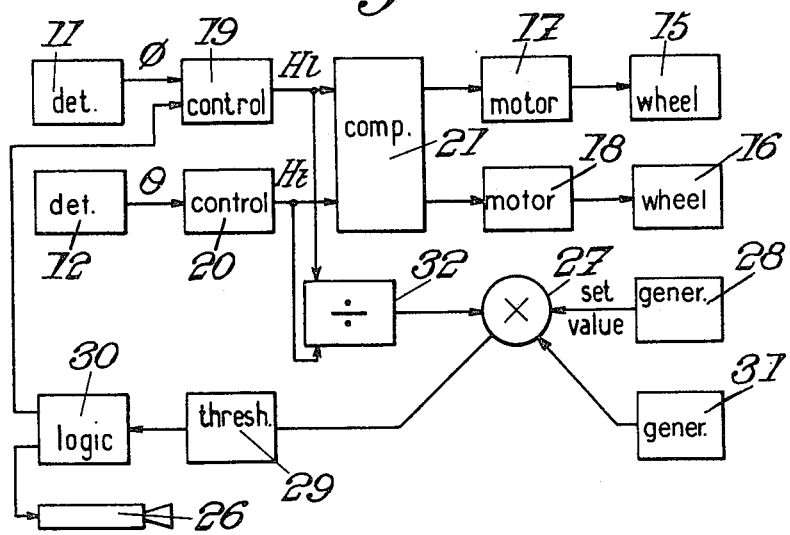
FIG. 3a is a modification of FIG. 3.

Referring to FIG. 1, there is illustrated a satellite 10 which will be assumed to be in a stationary circular earth orbit whose radius is 42,500 kms and which is inclined at an angle α of a few degrees at most to the earth's equator. The satellite 10 is associated with a triad consisting of three orthogonal axes, respectively the roll axis Ox, the pitch axis Oy and the yaw axis Oz of the satellite body. Under ideal conditions, when the attitude of the satellite is correct, the roll axis Ox extends parallel to the earth's equatorial plane in the west-east direction and the yaw axis Oz extends towards the center of the earth with the pitch axis Oy perpendicular to the roll and yaw axes and consequently to the orbit plane. Since the orbit is inclined, the terrestrial latitude of the satellite varies cyclically over a 24-hour period, and the satellite attitude about the roll axis has to be adjusted as it moves along its orbit. Also, perturbation torques acting on the satellite (solar radiation pressure unbalances in the case of a geostationary satellite and aerodynamic disturbances in the case of a low-orbit satellite) and the interfering effects of correction thrusters, when the same operate, tend to change the attitude of the satellite and their effects must be compensated for. In addition an initial attitude acquistion is required immediately after the satellite has been placed in synchronous orbit at correct station.

Satellite 10 is provided with an actuator as hereinbefore defined whose momentum vector is within the pitch-yaw plane (yOz plane). Attitude control then uses relationships between the operating parameters of the satellite. The selected set of relationships will be:

$$\begin{cases} I_x\ddot{\phi} + H_t\dot{\psi} + \omega_o H_1 = M_{dx} \\ I_z\ddot{\psi} - H_t\dot{\phi} + \omega_o H_t = M_{dz} - \dot{H}_1 \end{cases} \quad (1)$$

$I_x$ and $I_z$ are the inertias of the satellite assembly about the roll and yaw axes (axes bound with the satellite);

$H_t$ is the component of the momentum of the actuator (consisting of two wheels in the embodiment shown) along the pitch axis Oy, $H_1$ is the component of the momentum of the actuator along the yaw axis Oz;

$\dot{H}_1$ is the derivative of $H_1$ with respect to time;

$\omega_o$ is the orbital rate of the satellite (in rad/sec);

$\phi$ and $\psi$ are roll and yaw angles (Euler angles); and $M_{dx}$ and $M_{dz}$ are disturbing roll and yaw torques of various origins including those created by intermittently operating orbit-correcting gas jets or thrusters.

Attitude control about the three axes requires a measurement for detecting attitude errors and corrective action.

Two detectors 11, 12 which can be combined to form a single detector measure roll and pitch errors. The detectors can be optical (horizon) sensors or RF sensors receiving transmissions from an earth located source. It will be assumed that the detectors 11, 12 deliver analog signals, although detectors which deliver optical signals can be used as well.

The measurement necessary for yaw angle control uses signal pulses delivered by tachometer generators 13, 14 connected to momentum wheels 15, 16, the frequencies $f_1$, $f_2$ of the pulses delivered by generators 13, 14 being proportional to the rotational speeds of the wheels 15, 16, respectively. The wheels are generally identical.

Both wheels 15, 16 have their rotation axes located in a plane parallel to the plane containing the yaw axis Oz and the pitch axis Oy of the satellite 10. The axes of the wheels 15, 16 are at an angle greater than the maximum inclination angle α of the satellite orbit.

The actuator consists of two wheels 15, 16 driven by independent driving motors 17, 18 whose speed may be modulated at least in a predetermined speed range around a rated speed which is usually the same for both wheels 15, 16, at least if the wheels are identical. By modifying the speed of the wheels:

the value of the momentum $\vec{H}$ of the actuator consisting of the two wheels can be varied whatever the direction of such momentum, so that disturbance momenta applied to the satellite by external disturbing torques and represented by a vector in the plane of the wheels can be stored, and the satellite can be controlled around the direction of the momentum $\vec{H}$ of the actuator, and the direction of the momentum $\vec{H}$ can be varied separately in an angular zone of limited extent of the plane defined by the axes of the wheels—i.e. of the pitch-yaw plane—so that, as a result of momentum exchange between the wheels, the angular location of the satellite around its roll axis can be changed.

Short-term attitude stabilization around the axis perpendicular to $\vec{H}$ and to the roll axis Ox is provided without the intervention of an active control system by the gyroscopic stiffness of the actuator—i.e. passively. Long-term attitude control about the same axis has to be active and performed by means which apply an "external" tilting torque to the satellite, as will be described hereinafter.

The electronic control circuit associated with the detectors 11, 12 and wheels 15, 16 can be of the form diagrammatically shown in FIG. 3.

The roll and pitch control circuits comprise, starting from the output of each of detectors 11, 12 an amplifier (not shown) and a control network 19,20. The function of the network 20 is to determine the component $H_t$ of the momentum of the actuator rquired along the pitch axis Oy for the satellite to be properly oriented about that axis. The network 20 usually comprises a low-pass filter whose cut-off frequency is chosen having regard to background noise (particularly noise of the detector) and a proportional, integral and double integral correcting network whose output signal may be selected to represent either a speed or a speed variation. The correcting network could also be of a type which delivers a signal representing a torque, and then the correcting network would have proportional, integral and derivative terms. The output signal of network 20 is applied to one of the inputs of an analog control computer 21 for computing the set speeds of wheels 15, 16.

The roll control network 19 is adapted to determine that component $H_1$ of the momentum of the actuator which is required along the yaw axis Oz. Like network 20, network 19 usually comprises a low-pass filter and a correcting network which has a proportional, a derivative (for damping) and an integrating (restoring) action. To decrease the static roll error, it may be useful to further provide a double integral term. The output of network 19 feeds a second input of computer 21.

Computer 21 determines the set values which the wheels 15, 16 must have if their momenta $H_1$, $H_2$ are to be such that the resultant momentum $\vec{H}$ has components $H_t$ and $H_l$ along axes Oy and Oz. Calculation is the result of a simple breakdown, having regard to the angles $\alpha_1$ and $\alpha_2$ of the axes of the wheels 15, 16 with the pitch axis Oy, as shown diagrammatically in FIG. 4. The outputs 22, 23 of the computer 21 control the energizing circuits of motors 17, 18 which drive the wheels 15, 16.

The values $H_1$, $H_2$ may require to set speeds which are too fast or too slow for the wheels to accept them. In this case, a range-limit detector circuit (not shown) energizes a pitch momentum unloading gas thruster 32 which has its axis in the yaw-roll plane and results in an impulse being applied by mass ejection in an appropriate direction.

The yaw control circuit can be of the type shown in FIG. 3 if the input signals are digital. That circuit eventually supplies either of the two oppositely acting nozzles of a thruster 26 (as illustrated in FIG. 2) or a pair of separate thrusters with energizing signals to operate the or each thruster in the appropriate direction when necessary to restore the angle of the momentum vector $\vec{H}$ of the actuator around roll axis Ox to a set value which depends on the latitude of the satellite. The axis of thruster 26 or of the axes of symetrically located thrusters (delivering a torque without associated propulsion force) intersect(s) the pitch axis Oy.

The input circuit 24 of the yaw control system is to determine angle $\beta$ of $\vec{H}$ as measured around the roll axis Ox e.g. relatively to the pitch axis Oy taken as origin. Accordingly, circuit 24 can be a counter receiving signals supplied at frequencies $f_1$, $f_2$ proportional to the speeds of the wheels 15, 16 by the respective tachometer generators 13, 14. If the circuit 24 delivers a measurement signal at a sufficient rate (one to some minutes) the pointing errors about the yaw axis remain acceptable; to this end, the yaw control circuit is energized again each time a periodic signal is applied to a sampling input 25. Upon receiving each sampling signal, circuit 24 delivers an output signal representing the angle $\beta$ of H, as follows:

$$\beta = \frac{af_1 - bf_2}{a'f_1 + b'f_2} \quad (2)$$

wherein a, b, a', b' are constants whose value depends upon the geometry of the actuator, and $f_1$, $f_2$ are the signal frequencies (proportional to the momenta of wheels 15, 16).

The circuit 24 can be extremely simple in design. It can consist of registers and two up-down counters. One counter stores the signals of frequency $a'f_1 + b'f_2$ from the sampling signal it receives; when its content reaches a predetermined number N, it blocks the arrival of signals of frequencies $af_1 - bf_2$ to the other counter. The contents of the latter are proportional to $\beta$. Calculations performed in this way also provide filtering by removing high-frequency disturbances.

The actual values of $\beta$ and its set value $\beta_o$ are compared in a comparator circuit 27 receiving the output signal from circuit 24 and the digital signal $\beta_o$ delivered after each sampling by a set value generator 28. The value of the latter signal varies and its period is the period of rotation of the satellite around the earth (24 hours in the case of a stationary satellite). The difference between $\beta$ and $\beta_o$ represents the drift of the momentum around the roll axis Ox relatively to a reference direction for which the satellite antennas are ideally aimed. A threshold circuit 29 compares the drift with a preset value; the drift threshold value is usually from 0.05° to 0.2°. If this value is exceeded, the threshold circuit 29 transmits a correcting signal to a logic system 30 for energizing the appropriate nozzle of thruster 26 and a compensation signal. The system 30 operates the thruster 26 for a predetermined time. Also, shortly before the thruster 26 is operated, the system 30 transmits to the roll control channel an anticipating signal representing the disturbance which the thruster 26 will produce. The latter signal is applied to an additional input of the network 19 and minimizes the nutation transient when the thruster applies a pulse, having regard to the time constant required to change the speed of the wheels and to the resonant frequencies of the roll control system.

The comparator 27 can receive an additional signal from a generator 31 adjusted to allow for the biases of the wheels as found in tests made before or after the placing in orbit.

In a modified embodiment (not shown) the variations of the denominator of formula (2) are neglected; that approach leads to a simplification in the electronic circuitry.

It may also be possible not to compute $\beta$ from measurements of the wheel speeds, but rather to compute $\beta$ from the signals controlling the speeds (i.e. providing set values of the speeds). That approach makes it possible to replace the circuitry of FIG. 3 with the simplified circuitry of FIG. 3a (where the elements corresponding to those in FIG. 3 are designated by the same reference numbers).

In FIG. 3a, circuits 19 and 20 deliver the set values of $H_l$ and $H_t$, respectively; it is assumed that $\beta$ is adequately given by:

$$tg\,\beta = \frac{H_1\,(\text{set})}{H_t\,(\text{set})} \quad (3)$$

tg $\beta$ is delivered by a divider 32 since $\beta$ is always small, it may generally be assumed that tg $\beta \simeq \beta$. Then the balance of the circuitry is similar to that of FIG. 3.

If the structure is such that $H_t$ (set) does not vary much, then $\beta \propto H_1$ (set); if that assumption is fulfilled, then the circuitry may be further simplified.

Generator 28 will be provided in most cases, but may have different functions:
- if angle $\alpha$ is appreciable, a corrective term is required for compensating the effect of the latitude variations and the corresponding signal will be in the form of a sine wave;
- if external perturbating torques with a 24 h period are applied (due to sun action for instance), the set value should also be modified and the variation will be simulated with an additional sine wave signal which will frequently have a phase shift with respect to the first one.

In order to decrease the propellant consumption, thruster 26 (but not thruster 32) may advantageously be replaced with magnetic coils. If angle $\alpha$ is large, or if the satellite should be accurately pointed about the roll axis (for instance if the satellite is a communication satellite cooperating with an earth station operating at low elevation angles and located at a high lattitude), the generator deliver a sine wave to computer 21. That signal will be used for roll control and will result in directing the yaw axis in a direction which will not cross the earth center, but will exactly compensate for the effect of the latitude variations.

In the embodiment of FIGS. 2–4, the actuator consists of two momentum wheels with their momenta oriented symetrically with respect to pitch axis Oy.

Figure 4A:
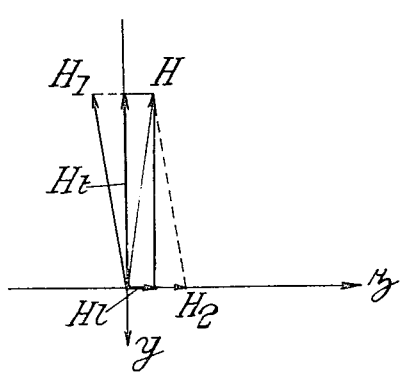
FIGS. 4a and 4b are graphs similar to FIG. 4 and corresponding to actuators in modified embodiments of the invention.

In the embodiment illustrated schematically in FIG. 4a, the actuator consists of a momentum wheel having its axis in the yOz plane at an angle of a few degrees with the negative direction of Oy and a reaction wheel (or a momentum wheel having an inertia much lower than that of the first wheel) having its axis along the yaw axis Oz. Referring to FIG. 4a, the momenta $H_1$ and $H_2$ of the two wheels and the components $H_t$ and $H_1$ along the pitch and yaw axis are illustrated in an exemplary configuration. It will be appreciated that the inertia of the second wheel will be selected depending on the angle $\omega$ between $H_1$ and $O_y$.

If the relative inertia of the two wheels and angle $\omega$ are appropriately selected in the embodiment of FIG. 4a, it may be possible to achieve attitude control while rotating the second wheel in one direction only in operation and consequently removing the problems associated with zero speed crossing and measurement of low speeds. Such problems are particularly acute if conventional bearings are used. On the other hand, if magnetic bearings are used, the arrangement of FIG. 4b may be of advantage.

Figure 4B:
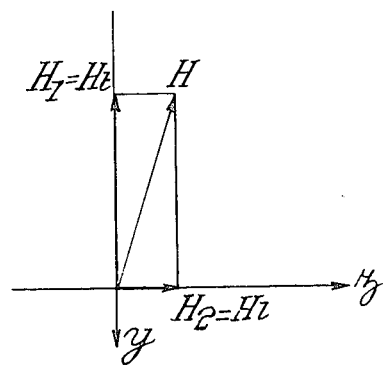

In the embodiment of FIG. 4b, the first wheel is located for its momentum $H_1$ to be opposite to Oy while the second wheel is a pure reaction wheel rotatable in both directions and whose momentum $H_2$ may be along Oz or opposite to Oz, depending upon the direction of rotation.

I claim:

1. An attitude control system for a body-stabilized space vehicle designed for travelling in an orbit and having roll, pitch and yaw axes, comprising: a plurality of sensors carried by the vehicle for sensing angular deviations about at least two of said axes, an actuator including only two wheels rotatable about respective non-aligned spin axes fixed with respect to said vehicle, electronic control means connected to receive input signals from the sensors and to control the rotation speeds of said two wheels for attitude correction about two orthogonal axes of said vehicle, said actuator permanently having, in operation, a momentum providing a gyroscopic stiffness providing short term stabilization about a third axis orthogonal to said two orthogonal axes, wherein each wheel is operatively associated with a tachometer generator and the electronic control means has means each associated with one of said tachometer generators to compute the angular position of the momentum of the actuator relative to said axes of the vehicle.

2. A system according to claim 1, wherein the axes of said wheels are located in a plane parallel to a plane containing the pitch axis and orthogonal to the roll-yaw plane.

3. A system according to claim 1, wherein the sensors are located for sensing angular deviations about the roll and pitch axes and the axis of each wheel is disposed in a plane parallel to the pitch and yaw axes.

4. A system according to claim 1, wherein the actuator consists of two identical wheels and the axes of the two wheels make an angle from 10° to 80°.

5. A system according to claim 1, wherein the actuator consists of two wheels which have momenta of different orders of magnitude and wherein the axes of the two wheels make an angle of from 90° to 130°.

6. A system according to claim 1 wherein the means for producing a torque relative to said third of said orthogonal axes are mass ejection thrusters.

7. A system according to claim 1, wherein said generators are constructed to deliver signals at frequencies $f_1$ and $f_2$ proportional to the speed of respective ones of said wheels and said electronic means determine the angular position of the momentum of the actuator with respect to the orthogonal axes by counting the number of pulses of frequency $(af_1 - bf_2)$ occurring in a time period equal to that necessary to count a predetermined number of signals of frequency $(a'f_1 + b'f_2)$, a, b, a' and b' being constant values.

8. A system according to claim 7, further comprising electronic circuit means connected to receive data representative of the angular position of the momentum of the actuator with respect to said orthogonal axes and to control means for delivering external torques which modify the angular position of the vector representative of said momentum.

9. A system according to claim 1, further comprising electronic closed loop circuits connected to receive signals from the tachometer generators and to adjust the speeds of the wheels at set values provided by electronic circuits receiving input signals from the sensors.

10. A system according to claim 9, wherein the set values are used to control means for delivering external torques.

11. A system according to claim 10, wherein said torques are momentum unloading torques.

12. A system according to claim 7, further comprising a sine wave signal generator at orbital frequency cooperating with said electronic means to define a set value of the momentum of the actuator with respect to the orthogonal axes.

13. A system according to claim 12, wherein the output of the sine wave signal generator is compared with the measured angular position of the momentum of the actuator with respect to the orthogonal axes by the electronic means controlling the external torques and the difference is maintained close to a substantially constant set value.

14. An attitude control system for a body-stabilized space vehicle designed for travelling in an orbit around the earth and having roll and pitch axes which in operation should be retained perpendicular to the radial direction from the earth to the vehicle with the pitch axis in the vicinity of a direction perpendicular to the plane of the orbit, comprising:

a plurality of sensors carried by the vehicle for sensing angular deviations about said roll axis and said pitch axis, an actuator including only two wheels rotatable about respective non-aligned spin axes fixed with respect to the vehicle, said wheels being located and controllable to have, in operation, a resultant monomentum angularly located in a direction close to the direction of the pitch axis, means for producing an external torque relative to the roll, pitch and yaw axes, tachometer generators associated to said wheels and providing signals representative of the speed of said wheels, and electronic control means connected to receive input signals from said sensors and from said tachometer generators and signals representative of said values and to control the rotation speed of said two wheels for correcting the vehicle attitude about the pitch axis and yaw axis and for controlling said means for producing external torque.

* * * * *